United States Patent [19]

Charpentier

[11] 3,800,018
[45] Mar. 26, 1974

[54] FABRICATION OF CELLULAR RESINOUS PRODUCTS

[75] Inventor: Maurice Charpentier, Rantigny, France

[73] Assignee: Saint-Gobain, Neuilly sur Seine, France

[22] Filed: Aug. 26, 1970

[21] Appl. No.: 66,970

Related U.S. Application Data
[63] Continuation of Ser. No. 542,367.

[30] Foreign Application Priority Data
Apr. 15, 1965 France .............................. 65.13377
Aug. 27, 1969 France .............................. 69.29272

[52] U.S. Cl................... 264/53, 161/159, 161/161, 161/166, 264/55, 264/126, 264/345, 264/DIG. 5, 264/DIG. 9, 264/DIG. 15, 425/4, 425/4 C, 425/363, 425/384
[51] Int. Cl........................ B29d 27/00, B29d 27/08
[58] Field of Search ........... 264/42, 51, 53, 321, 44, 264/DIG. 14, 55, 126, 345, DIG. 5, DIG. 9, DIG. 15; 161/159, 161, 166; 425/4, 4 C, 363, 384

[56] References Cited
UNITED STATES PATENTS

| | | | |
|---|---|---|---|
| 3,616,162 | 10/1971 | Noziere | 161/166 X |
| 3,736,081 | 5/1973 | Yovanovich | 425/4 C |
| 3,736,082 | 5/1973 | Wick | 425/4 C |
| 2,722,719 | 11/1955 | Altstadter | 264/DIG. 14 |
| 3,301,935 | 1/1967 | Stoeckhert | 264/DIG. 14 |
| 3,255,286 | 6/1966 | Luc-Belmont | 264/51 UX |
| 3,359,353 | 12/1967 | Oddi | 264/53 UX |
| 3,368,009 | 2/1968 | Oddi | 264/53 |
| 3,452,390 | 7/1969 | Borcovec | 264/53 |
| 3,470,276 | 9/1969 | Ohno | 264/44 |
| 3,488,411 | 1/1970 | Goldman | 264/47 X |
| 3,501,558 | 3/1970 | Munters et al. | 264/47 |

FOREIGN PATENTS OR APPLICATIONS

| | | | |
|---|---|---|---|
| 756,654 | 9/1956 | Great Britain | 264/53 |
| 849,117 | 9/1960 | Great Britain | 264/53 |

OTHER PUBLICATIONS
Ferrigno, T. H. "Rigid Plastid Foams" New York, Reinhold, c. 1963 pp. 140–148.
Bender, Rene J. "Handbook of Foamed Plastics". Libertyville, Ill. Lake Publ. Co., c 1965 pp. 255–259 253.

*Primary Examiner*—Philip E. Anderson
*Attorney, Agent, or Firm*—Synnestvedt & Lechner

[57] ABSTRACT

Method and apparatus for the production of agglomerated granules of polystyrene, in sheet or block form. The expanded granules are uniformly heated under relative slight compression by blowing air through them for a period of between 10 seconds and three minutes. The air is preferably at or above the softening temperature of the granules. The heated granules are then compressed under a pressure of from 0.5 to 4 metric tons/m.² until their apparent volume is approximately one-half their original volume. The compressed granules are then cooled while remaining under pressure, to a temperature at which the agglomeration does not swell or re-expand. The method can be carried out by batch or by continuous procedures.

8 Claims, 9 Drawing Figures

Inventor
MAURICE CHARPENTIER

Inventor
MAURICE CHARPENTIER

By Bauer and Seymour
Attorneys

FABRICATION OF CELLULAR RESINOUS PRODUCTS

This application is a continuation in part of U.S. Ser. No. 542,367, filed April 13, 1966.

This invention relates to the fabrication of cellular products of thermoplastic resin and, in particular, to the fabrication of such products as panels, sheets, slabs, or plates, for use in thermal insulation having good mechanical strength and of low density.

In the fabrication of such cellular products, for example, polystyrene foam, it is usual to start with small granules of the material, in which a foaming or blowing agent has been incorporated. The material when heated, causes the volatization of the blowing agent and expands the granules into beads or pellets.

The prior art procedure wherein the pressure required to give the expanded beads the desired cohesive form, is created by the internal expansion of the beads at the instant of volatization of the blowing agent, does not result in a homogenous product of low density. Nevertheless, such products having a high degree of homogeneity and low density are commercially sought and are advantageous because they require a minimum amount of material per unit volume of finished product and at the same time afford excellent thermal insulation.

In accordance with the present invention, beads of material which have been previously expanded, are subsequently subjected to compression to cause them to agglomerate and cohere into the desired shape or form. In carrying out the invention the material may be beads of polystyrene expanded in the manner taught by applications Ser. No. 542,236 and 542,363, both filed on April 13, 1966 and assigned to the assignee of the present application and now U.S. Pat. No. 631,133, and 2,598,769 respectively. These expanded beads are of particular interest because they have a specific gravity of the order of 5 kg./m.$^3$, or less. They are produced by the method taught in the second of the aforesaid applications, according to which the granules are first heated in air, to a temperature of about 90° to 100°C., or above, and are next treated with steam. The expanded beads may also be produced by the method taught in the first of the aforesaid applications, wherein the granules are first expanded by steam at atmospheric pressure and then, after drying, treated with steam under pressure in an autoclave.

The method of the present invention relates to the agglomeration of the expanded pellicles or beads, in three steps. First, the beads are reheated to softening temperature. Secondly the heated beads are subjected to compression sufficient to impart the desired thickness and density to the agglomerated particles. Thirdly, the shaped material is cooled while subjected to compression sufficient to maintain the aforesaid desired thickness.

The reheating of the beads constituting the first step, as aforesaid, is desirably effected by heated air or, alternatively, by steam under pressure. During this step the beads should not be subjected to compression. However, it is permissible to subject the material to a degree of compression after it has reached a plastic or softened state, in order to reduce the thickness of the agglomerated mass by a decrease in the interstitial spaces between beads.

Utilization of heated air during the first step of the method permits operation at atmospheric pressure. This also enables an appreciable reduction, if necessary, in the inflation of the beads of material at the instant of their heating. Moreover, it is important to control the temperature very accurately during the first step, because too high a temperature causes the beads to harden, while if the temperature is too low, the material is poorly agglomerated.

The second step, wherein the material is formed into the desired shape, is effected without additional heat in maintaining the beads at the temperature imparted to them in and during the first step. It is desirable to maintain the material at the same thickness throughout the second and third steps. The invention contemplates in particular, utilizing the same means of compression throughout these two latter steps of treatment.

As another characteristic of the invention, I have found that the apparent density, that is, the mass per unit volume occupied by the beads and the interstitial spaces therebetween, should be selected as a function of the desired final density of the product. If this apparent density is too low, the final product will be excessively porous. On the other hand, if the apparent density is too high, the resulting product will be deficient in desired mechanical properties. The most desirable apparent density is between 0.4 and 0.6, and preferably about 0.5. The method can be carried out either continuously or discontinuously, as will be subsequently explained.

Other characteristics, objects and advantages of the invention will become clear from a study of the following detailed description, in connection with the accompanying drawing.

Figure 1:
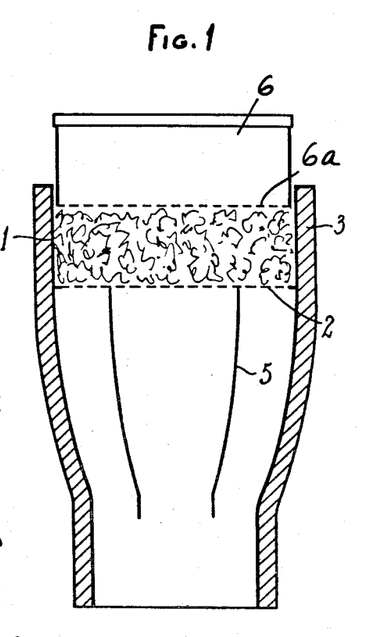
FIG. 1 illustrates a mold, partly in section, for carrying out the method in a discontinuous way, and loaded with a charge of granules.

Referring to FIG. 1, a mold 1 is provided with a perforated bottom 2 and is enclosed by heat insulating material 3. The expanded polystyrene beads of low density, are deposited into the mold and a cover 6, having a perforated bottom 6a smoothly fitting the mold, is placed over the material to form a piston by which it may be compressed. At this stage the cover exerts little or no pressure upon the beads or pellets.

Figure 2:
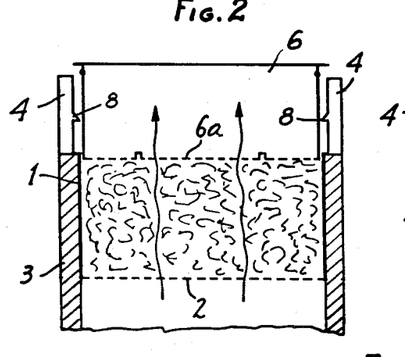
FIG. 2 shows the mold of FIG. 1 moved to a second position for heating of the material.

Transferring attention to FIG. 2, the beads are next heated by blowing air through the mold. The heated air passes freely through the perforation in bottoms 2 and 6a. Diffusers or baffles 5, FIG. 1, positioned within the mold below its perforated bottom, guide, direct and uniformly distribute the air. This air has a temperature between about 103° and 130°C., and is blown into and through the mass of beads for a period of between 10 seconds and three minutes. The temperature of the air should be above the softening temperature of the beads and higher in proportion as the period of heating is short, that is, inversely proportional to the time of heating, within the temperature range given. Selection of air temperature will also depend to a extent upon the thermal inertia of the base of the mold through which the air is blown. For instance, using the same mold, like results are attained by heating for three minutes with air at 112°C., for one minute at 117°C., and for 12 seconds at 120°C.

As previously noted, the temperatures of the air are regulated or controlled precisely and experimentally in accordance with results attained. If, after pressing, the beads are poorly united, the temperature is too low and should be raised. If, on the other hand, the product is hard and of poor appearance, the temperature is too high and should be lowered.

Figure 3:
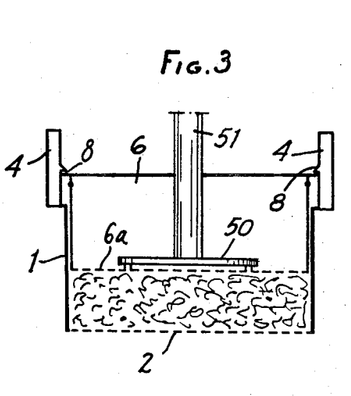
FIG. 3 shows the same mold positioned in a press and with the granules therein fully compressed.

Having completed the first step, the reheating of the material, the mold and its cover are transferred to a location on a press, where bottom 6a is engaged by the foot 50 of press plunger 51, and the material is compressed until its volume is approximately one-half of the original, as is clearly shown upon FIG. 3. This requires on the average, a pressure of from 0.5 to 4 metric tons/m.$^2$ of mold area, and depends to a certain extent upon the temperature attained or used in the first step, and the desired specific gravity of the final product. The rate of descent of cover 6 should be relatively rapid at first and slower as pressing nears completion. Duration of compression is of the order of five seconds for a descent of the cover of about 10 cm.

Figure 4:
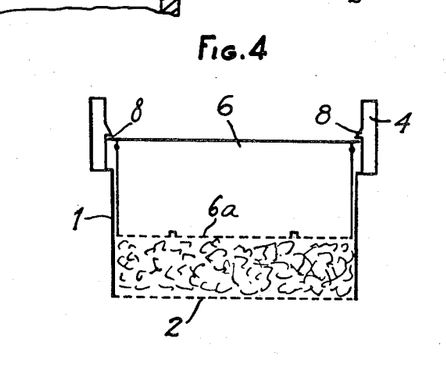
FIG. 4 shows the mold at a location where the material is cooled in the third and final step.

Turning to FIG. 4, the cooling which constitutes the third step of the method, should take place while maintaining the thickness and density of the product at the close of the pressing or second step. Cooling is continued until the product has a temperature sufficiently low so that it does not swell or re-expand.

In practice it is advantageous to utilize several duplicate molds, for example, three. These are moved in succession to the respective locations for filling with beads, as in FIG. 1, for reheating by air, as in FIG. 2, for pressing as in FIG. 3, and for cooling as in FIG. 4. Thus any given charge or quantity of beads is treated in one and the same mold throughout the method.

Referring to FIGS. 2, 3, and 4, it is noted that mold 1 is equipped with a number of projections 4 secured to its rim portion and projecting upwardly therefrom. These projections or lugs have inwardly directed latch means 8 which, in a way clear from FIGS. 3 and 4, snap over the rim of cover 6 and hold it in the final position to which it is forced by press plunger 51, for the final or third step of cooling. Of course the molds are reusable and may be repeatedly filled with beads or pellets, for reheating.

FIGS. 5 through 8 show a machine for carrying out the method in a continuous manner.

Figures 5, 5A:
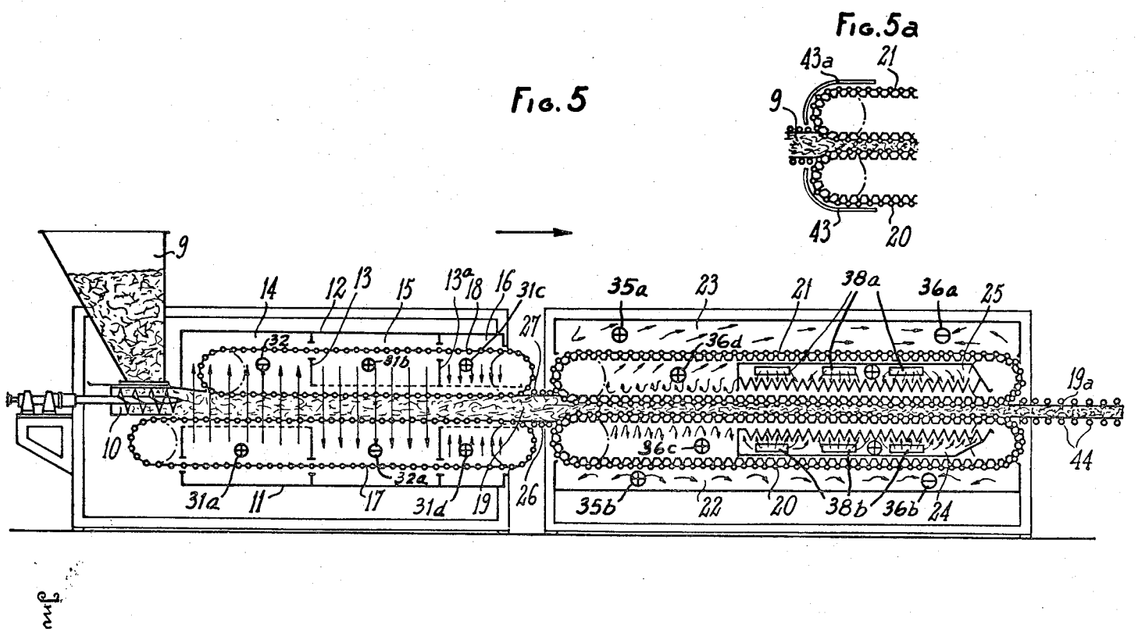
FIG. 5 shows in vertical longitudinal elevation, partly in section, an apparatus by which the method is carried out continuously.
FIG. 5a is a detail view of the apparatus depicted upon FIG. 5.

Beads of polystyrene are deposited into a hopper 9. These beads may be as taught in the second of the aforesaid two applications, above identified. The hopper may be located after the crushing means disclosed in the application, with a storage bin between them.

The beads are fed by the hopper to one or more power-driven feed screws by which they are impelled horizontally onto the upper pass of the lowermost one 17 of two conveyor belts formed of interconnected metal links. The second belt is identified at 18. The belts are power driven so that the material fed to them by screw or screws 10, fills the space between their contiguous passes. The rate of feed is so correlated with the speed of the belts as to exert a moderate degree of compression upon the material and thus assure that there are no voids in the space between passes. During the first part of their travel with and between the belts, the beads are reheated by air introduced into the lower portion 11 of a housing or casing enclosing the belts. The heated air passes upwardly through the material and belts as they traverse a first compartment 14. Within a second and adjacent compartment 15 the heated air is directed downwardly through the layer of material. A third compartment 16 has a shorter dimension in the direction of travel of the material. The three compartments are defined by spaced baffles or partitions 13, 13a, each comprising a lower plate and a coplanar upper plate, each having an edge closely adjacent a respective one of the belts.

The conveyors 17 and 18 limit the thickness of the layer of material created thereby, and by their open construction permit proper circulation of heated air. The resultant heating of the material, as previously described, effects a slight agglomeration of the beads. The two contiguous passes of belts 17, 18 may be parallel, as shown, or alternatively, may be slightly inclined toward one another in their direction of travel. When inclined, the belts effect a slight reduction in thickness of the layer of agglomerated beads as they progress toward the delivery end of the belts, and a slight compression of the material with consequent reduction of the interstitial spaces thereof. While I have shown but one pair of conveyor belts 17, 18 in the model illustrated, it will be understood that the heating step may be carried out by two or more pairs of belts passing the material in succession.

It is contemplated that a suitable degree of suction may be used in the feeding system to create a flow of air downwardly and thus facilitate the efficient flow and placement of the pellets to and within hopper 9.

The increasing agglomeration effected by and between belts 17, 18, has the effect of reducing the flow of heated air through the material as it approaches the delivery end of the belts. For this reason, the flow of heated air in compartment 16, is directed inwardly toward both conveyor belts in order to maintain them at the desired temperature. This is illustrated in FIG. 5, by the arrows over and below the belt portions in compartment 16.

Upon emerging from between belts 17, 18, the layer of agglomerated beads in the form of a plate has sufficient cohesion to enable it to be transferred to the second stage of the apparatus where the compression forming the second step is effected. As clearly shown upon FIGS. 5 and 6, the second step is carried out by and between two conveyor belts 20 and 21 so positioned with respect to belts 17, 18 that the material passes in a straight line directly from the first to the second pair. Belts 20, 21 are heavily built and so constructed and supported that they are able to exert upon the plate of layer of agglomerated beads, a high pressure of the order of 4 metric tons/m.$^2$. For example, these belts may comprise interpivoted metal plates with rigid backing plates, rollers, or supports. In carrying out this second step, belts 20, 21 are located respectively within lower and upper compartments 22, 23 which in their upstream portions are traversed by heated air. The downstream portions of these compartments contain walls or baffles which form two discrete lower and upper chambers 24 and 25, below and above the belts and including as shown, crimped or corrugated walls parallel with and contiguous to the downstream portions of the respective belts. Cooling air is circulated in and through these chambers, to cool the material. Alternatively, cooling may be effected by the circulation of a fine spray of a cold liquid. Thus as the band or ribbon of material advances with and between belts 20, 21, it is compressed while the temperature of the two surfaces of the band is slightly elevated above that of the interior thereof, to effect a densification of the surface layers. The surfaces of the band are thereby smoothed. The reduced thickness is maintained by the belts during the third step of final cooling of the ribbon.

While transfer of the ribbon from the heating to the compression stage, that is, from belts 17, 18 to belts 20, 21, may be made directly and without intermediate support, it is also contemplated that small rollers such as 26, 27, lower and upper, FIG. 5, may be provided to limit or prevent transverse expansion of the material as it emerges from between belts 17, 18. Likewise rollers, belts, or other suitable mechanism not shown, moving on or about vertical axes, may be provided at each side edge of the band as it emerges from the belts, to engage the edges and thus prevent lateral expansion. During the transfer between pairs of belts the material is in a semi-plastic state and this greatly facilitates the smoothing and truing of the edges of the plate, thereby enabling the production of accurate sheets or panels after the sheet emerges from the compression and cooling stages. Furthermore, by raising the temperature of the two surfaces of the plate just prior to its transfer from one pair of belts to the other, it is possible to smooth these surfaces and to create a surface density somewhat greater than that of the interior layers.

Compression of the plate to form a sheet is effected by and between conveyors 20, 21. The contiguous effective courses or passes of these belts are parallel and closely spaced. These belts serve to keep the compressed plate at a reduced thickness during the cooling thereof. This cooling takes place immediately after the compressed plate or sheet leaves the compression stage. The spacing of the effective contiguous passes of belts or conveyors 17, 18, and 20, 21, is so selected that the completed sheet emerging at 19a, FIG. 5, has a density of from 0.4 to 0.6, preferably about 0.5, with respect to the apparent density of the pellets as they enter between conveyors 17, 18.

It is noted that the heated air directed into the compartments 22, 23 at the upstream end of the compression housing, FIG. 5, does not pass through the compressed plate of material but merely impinges upon the portions of belts 20, 21 instantaneously traversing this end, the purpose being to reheat them to proper temperature. It is also contemplated that this reheating may be effected by radiation. Such a modification is shown in the detail view of FIG. 5a, where elements 43, 43a represent heat radiators located closely adjacent the respective conveyors as they pass about their guide rollers at the entrance to the compression stage. The conveyors are thus heated at the instant they pass into contact with the oncoming plate as it emerges from the heating step or zone. This superficial heating permits the facilitation of the ulterior heating by avoiding an important loss of heat and a loss of time for obtaining the cooling of the conveyors. Furthermore, the slight elevation of temperature within and during the compression stage, results in a smoothing of the surfaces of the product and increases the surface density thereof as compared with the intermediate layers.

As the compressed plate or sheet emerges from the cooling stage it is received by and between pairs of vertically spaced horizontal rollers 44, by which it is maintained at the same thickness that it has upon emerging, so that reexpansion or increase in thickness are prevented. Means not shown are provided to accurately regulate and maintain correct temperatures at every stage or step of production.

Figure 6:
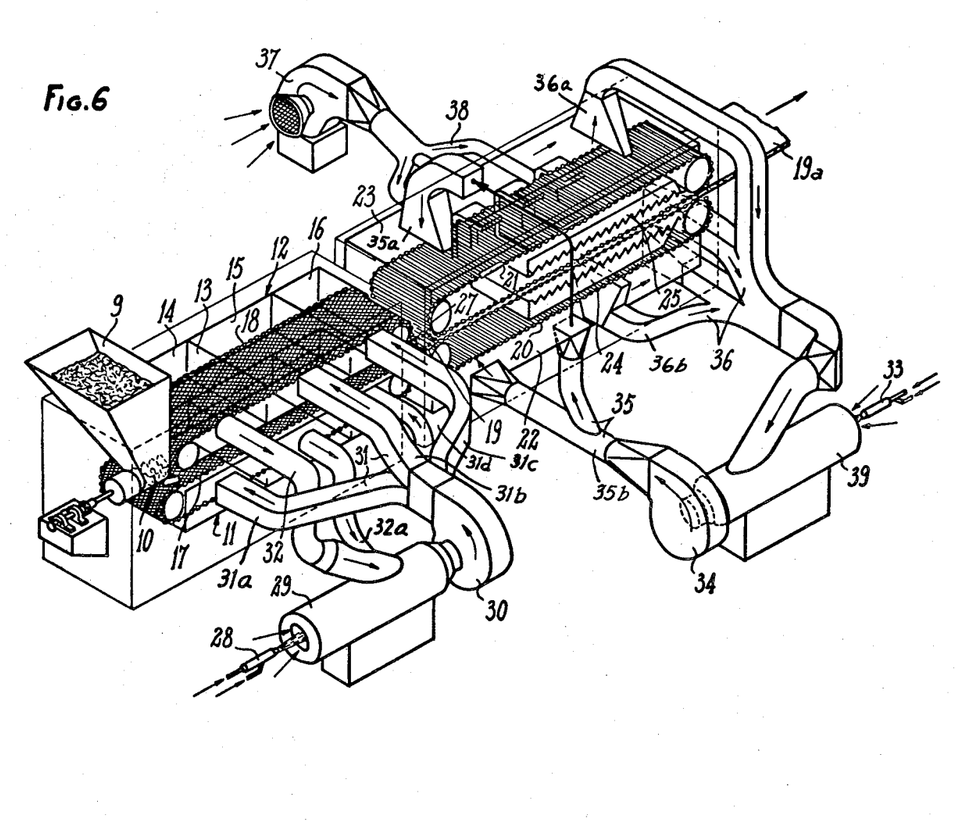
FIG. 6 is a perspective view of the apparatus of FIG. 5, with parts of the housing removed to more clearly illustrate details of construction.

FIG. 6 shows in perspective the apparatus of FIG. 5, and illustrates clearly the blowers and conduits by which the circulation of heated and cooled air is effected. At 28 is identified a burner which directs a flame into heat exchange casing 29 and from which heated air is drawn by blower 30. The output from this blower is divided into four branches generally identified at 31. One branch 31a delivers air to compartment 14. From FIG. 5 in particular, it is seen that the outlet from this branch is positioned at a level between the passes of conveyor 17 in compartment 14. This air is exhausted from compartment 14 by conduit 32, at a level between the passes of conveyor 18 therein.

A second branch 31b delivers air from blower 30 into compartment 15, at a level which, as shown upon FIG. 5, is between the passes of conveyor 18 therein. This air is exhausted from compartment 15 by conduit 32a at a level between the passes of conveyor 17 therein. Two other supply branches 31c and 31d deliver hot air from the blower into compartment 16, at vertically spaced levels between the passes of belts 18 and 17, respectively, therein. See also FIG. 5. This air escapes horizontally, most of it passing to compartment 15 and a small portion escaping to ambient air.

A second burner 33 directs hot gas to the interior of heat exchange casing 39, to heat surfaces therein over which air is drawn by blower 34. From this blower the air is delivered by conduits 35 into compartments 22 and 23. Thus, a first outlet 35a, FIG. 5, delivers air into compartment 23 at the upstream end of and above the upper pass of conveyor 21. This air passes horizontally downstream where it is exhausted at 36a for return to the blower through conduit 36. A second outlet 35b delivers heated air into compartment 22 at a level below the lower pass of conveyor 20. The air passes horizontally along and below the lower pass of this conveyor and is exhausted at 36b for return to the blower. Third and fourth outlets 36c and 36d, FIG. 5, direct streams of heated air into compartments 22 and 23, respectively, between the passes of conveyor 20, 21. As indicated by the arrows, air from outlet 36c passes downwardly through the lower pass of conveyor 20 and mingles with air being exhausted from inlet 36b. Likewise, air from inlet 36d passes upwardly through the upper pass of conveyor 21 and mingles with air being exhausted from outlet 36a.

Cooling air is drawn in by blower 37, FIG. 6, and impelled through ducts 38 into chambers 24 and 25. As seen upon FIG. 5, these ducts have three outlets 38a opening into chamber 25 and regularly spaced therein in the direction of travel of the band, and three outlets 38b opening into chamber 24 and similarly spaced. Thereby a uniform distribution of cooling air is effected over the corrugated walls of the chambers, by which heat is extracted from the band passing between them. This air may be recirculated to cooling coils, or allowed to escape from the chambers through orifices therein.

Figure 7:
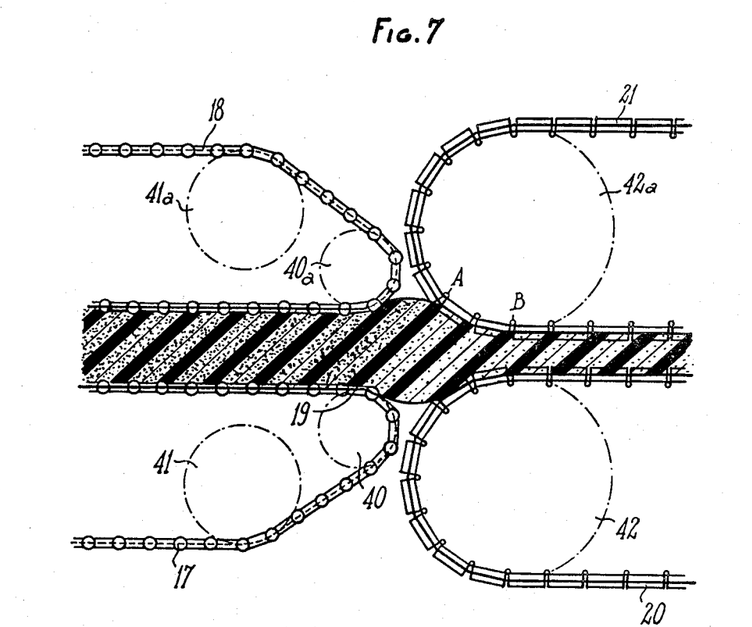
FIG. 7 shows details of construction of the apparatus at the location where the material passes from the heating zone to the compression zone.
Figure 8:
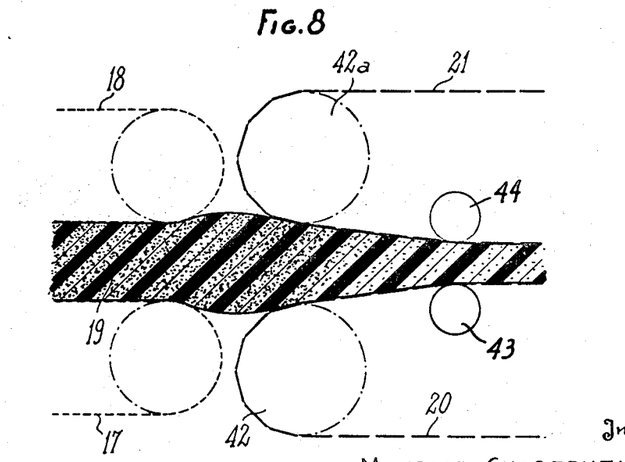
FIG. 8 shows schematically a modified form of the construction depicted upon FIG. 7.

At FIG. 7 there is shown a construction by which the length of the band passing between the heating and compression zones may be limited to a minimum. As shown, two auxiliary rollers 40, 40a of relatively small diameters, are journaled closely adjacent end rollers 42, 42a, respectively, of conveyors 20, 21. Conveyor belt 17 passes to large roller 41, thence to and about smaller roller 40. Similarly, conveyor belt 18 passes to large roller 41a, thence about smaller roller 40a. The distance traveled by band 19 between its emergence from between belts 17, 18, until it enters between 20, 21, is therefore short. As the band enters between belts 20, 21 it undergoes compression between points A and B, where its thickness is greatly reduced.

Where the speed of the conveyors is relatively high, such that compression between points A and B would be too high a rate, or too violent, the arrangement of FIG. 8 is useful. Here, end rollers 42, 42a of belts 20, 21, are quite widely separated. From roller 42 belt 20 passes upwardly and forwardly to a small idler 43. Similarly belt 21 after passing about end roller 42a, passes downwardly and forwardly to and about a small idler 44. These two idlers are spaced apart by substantially the desired thickness of the finished product. Since they are located downstream from roller pair 42, 42a, there is a smooth and gradual compression of the band and reduction of its thickness to the desired dimension takes place gradually.

In general, the linear speeds of the two pairs of conveyors are approximately the same because of the compression and increased density affected upon the band by and between belts 20, 21. However, these belt pairs are driven by means which enable change in their relative speeds and thus provide a degree of control over the density of the finished product, while permitting an attenuation which facilitates the passage from one pair of conveyors to the other.

As an example, in fabricating panels of 1 m. width and 40 mm. thickness, from polystyrene beads of about 4 kg./m.$^3$ density, by the apparatus of FIGS. 5 and 6, using a conveyor speed of about 6 m./min., the duration of the steps are about as follows: heating — 30 sec., compression — 10 sec., cooling — three minutes. Thus the heating section will have a length of three to four meters, and the compression and cooling section, a length of 15 to 20 meters, of which the compression section comprising belts 20, 21 will subtend about 0.6 m. and the remainder of these belts will constitute a cooling section subtended by chambers 24, 25.

I have discovered, since the original conception of this invention, that a material problem arises when high density cellular products are to be produced, and I have discovered the nature of the problem and have achieved a solution to it.

When cellular polystyrene products are to be prepared with a density above about 15 kg./m.$^3$, and especially when densities of 20 to 40 kg./m.$^3$ are to be attained, a phenomenon appears which is not present when the densities are less. Inasmuch as this phenomenon occurs in each formula, where identity of composition exists, to find its cause and cure has been a material problem. If we prepare a composition of polystyrene beads with a standard content of blowing agent, e.g. 6.5 percent, divide it into two parts, use one part to make cellular insulation having a density of 12 kg./m.$^3$, and use the other part to make cellular insulation having a density of 20 kg./m.$^3$, the former will have dimensional stability but the latter will not. For example, if the cellular insulation is made in blocks the 12 kg. blocks will be dimensionally stable but the planar and linear surfaces of the 20 kg. blocks will often develop deviations and even definite bulges which reduce appearance and utility, and in some cases can prove to be harmful to machinery or structures in connection with which they are used.

Without knowing all the reasons behind this phenomenon I have invented a cure for it which gives dimensional stability to shaped polystyrene objects such as molded articles and continuous sheets even after long periods of use at elevated temperature.

The main object of this part of the invention is to achieve dimensional stability in cellular polystyrene objects having densities above about 15 kg./m.$^3$ and the object has been achieved by limiting the content of blowing agent in the beads to about 4 to about 5 percent of the weight of the beads.

In carrying out the invention the process described above is used: The beads, containing 4 to 5 percent of blowing agent, are heated to their softening points, compressed in a second step to the desired shape and density, and in a third step the object is cooled under compression sufficient to maintain its shape and size.

Somewhat more than 5 percent of blowing agent is tolerable in many cases but I have demonstrated that if the content of blowing agent in the beads is greater than about 5.5 percent by weight of the beads, the resulting products do not have satisfactory dimensional stability under many conditions of use. Furthermore when the products are to be made continuously, for example as in FIG. 5, a vaporization of the blowing agent takes place establishing enough pressure between the shaping screens or conveyors to cause deviations from the planar in the surfaces of the sheet.

Prior to my present invention attempts were made to overcome the faults recited by prolonging the residence of the sheets or plates in the forming zone, by reducing the speed of the sheet and the output of the machine, but the attempt was neither a dimensional nor an economic success.

My present invention achieves dimensional stability, in denser objects, equal to that obtained in objects of lighter density, by limiting the content of blowing agent to less than about 5 percent by weight, and by using the same apparatus, methods, and the same speeds of production described hereinabove for the production of expanded beads having densities between 10 and 25 kg./m.$^3$, producing by the final pressing step objects having densities above 15 kg./m.$^3$ which retain their shape and size. Using the same speeds of production as are possible when producing the objects of lighter density, the invention produces the denser objects as molded articles or continuous sheets of homogeneous structure, with precisely flat sides, and uniform thickness. The lateral faces have planar surfaces and retain it during storage.

The following examples illustrate this phase of the invention:

EXAMPLE 1

Expansible beads of polystyrene containing 6.1 percent by weight of normal pentane and isopentane (ratio 4:1) were expanded in a commercial, vertical apparatus by insufflation with steam, producing beads having, after aging for 8 hr. at 20°C., an apparent density of 14 kg./m.$^3$. After a second expansion by steam in similar apparatus and aging for 8 hr. at 20°C., the apparent density of the expanded beads was 10 kg./m.$^3$.

The expanded beads were passed through a continuous production machine indicated above, producing plates having thickness of 40 mm. ± 1 mm., the speed in the shaping zone being 2.4 m./min. The final product had a density of 22 kg./m.$^3$.

Identical beads containing only 4.3 percent by weight of the same mixed blowing agent were similarly expanded, producing expanded beads of apparent density 10 kg./m.$^3$. These were also sent through the same machine, producing plates having the same density (22 kg./m.$^3$) and the same dimensions as the plates from the 6.1 percent composition. The duration of exposure to the steam was shortened to compensate for the reduced content of blowing agent, and the speed of the shaping conveyor was increased to 3.5 m./min. for the same reason, all other conditions being alike.

This example produced sheets of identical shape and size, of which one had been formed from polystyrene beads containing 6.1 percent blowing agent and the other from polystyrene beads containing 4.3 percent of the same blowing agent. Thus, this invention improves the rate of production of denser objects.

EXAMPLE 2

The beads of 14 kg./m.$^3$ provided by Example 1 from the composition containing 6.1 percent of blowing agent were fed into the continuous production machine, producing plates 40 ± 1 mm. thick of a density of 30 kg./m.$^3$, using a speed in the forming zone of 1.2 m./min.

The method was repeated using the beads of 30 kg./m.$^3$, producing plates identical in size and density, but the speed in the forming zone was 1.8 m./min.

EXAMPLE 3

Beads of polystyrene containing 4 percent by weight of pentane were expanded by steam in the apparatus of Example 1 and identically aged. A second expansion by steam was applied in like apparatus, followed by a second aging period, producing beads of apparent density 12 kg./m.$^3$. When beads were passed through the continuous plate forming machine, plates 40 ± 1 mm. in thickness were produced at a speed in the forming zone of 3.3 m./min., producing plates of 26.5 kg./m.$^3$ with a resistance to 10 percent compression of 96 kg./dm.$^2$, using the French standard NFT 56.101.

In the same way beads containing 6.5 percent by weight of pentane but otherwise identical were expanded, aged, expanded again, and aged again, producing beads of apparent density 12 kg./m.$^3$. When this product was passed through the same continuous forming machine at a speed in the forming zone of 1.2 m./min. plates of identical size were produced but which upon 10 percent compression by NFT 56.101 had a resistance to compression of only 78 g./dm.

This example shows that an increase in strength is also produced by this invention.

Examined under the microscope at 100x by transmitted light through thin slices of the object made from pearls of 4 percent pentane origin it was observed that the membranes separating the cells were about twice as strong as those separating the cells of initial 6.5 percent pentane.

EXAMPLE 4

Using the apparatus of Example 1 beads of polystyrene containing 3 percent by weight pentane were twice expanded and rested as aforesaid. The beads had an apparent density of 18 kg./m.$^3$. They were re-expanded in a horizontal apparatus, undergoing expansion by hot air in a first zone and expansion by steam in a second. After aging as aforesaid the apparent density of the beads was 10 kg./m.$^3$. These beads were passed through the continuous forming machine, producing plates of 22 kg./m.$^3$ density and 40 ± 1 mm. thickness. We will call these Plates A.

The plates produced from polystyrene beads containing 4 percent blowing agent in the second method of Example 1 were called Plates B and had the same density and size. The plates derived from beads of 4 percent blowing agent were less permeable to water and had better bending resistance than those made from the pearls of 3 percent blowing agent. The water permeability test was made by putting the plate under a pressure of 75 mm. of water at ordinary temperature, using a disk 87 mm. in diameter and of 25 mm. thickness obtained by removing the surface layers of a disk 40 mm. thick.

Test pieces A were permeated in 1 minute.

Test pieces B were not permeated after many hours.

Test pieces A by NFT 56102 flexing test gave 2.1 kg./cm.$^2$.

Test pieces B by NFT 56102 flexing test gave 3.0 kg./cm.$^2$.

Dimensional stability was measured during storage in a room varying from 15° to 25°C. The plates from the 6.1 percent blowing agent beads became deformed and no longer were within the tolerance limit of 40 ± 1 mm. established by manufacture. The plates produced from the 4.3 percent plates remained within the limits of 40 ± 1 mm.

The examples have thus demonstrated that the polystyrene beads having between about 4 and about 5 percent of blowing agent produce products superior to similar beads containing either more or less blowing agent, being superior to crushing as shown by Example 3, and superior in water resistance and in bending resistance as shown in Example 4.

As many apparently widely different embodiments of the present invention may be made without departing from the spirit and scope thereof, it is to be understood that the invention is not limited to the specific embodiments.

What is claimed is:

1. The method of agglomerating beads of expanded polystyrene into desired shape and form comprising expanding and aging polystyrene beads containing from about 4 to 5 percent by weight of a volatile hydrocarbon, reheating the expanded beads to a uniform softening temperature under essentially atmospheric pressure whereby the beads slightly aggloments to form a plate, by the passage of a hot gas through the beads for a time from about 10 seconds to about three minutes, compressing while still hot the plate into a desired shape, without the substantial addition of heat, and cooling the compressed plate while under compression.

2. A method of making polystyrene foam sheeting with parallel surfaces which has dimensional stability during storage at about 15° to 25°C., a density from about 15 to 40 kg/m$^3$, and compression resistance on the order of 2 to 3 kg/cm$^2$ which comprises expanding polystyrene beads containing from about 4 percent to not substantially more than 5 percent blowing agent of hydrocarbon type and aging them under conditions producing a medium density, again expanding the granules and aging them under conditions producing a density less than about 14 kg/m$^3$ after about eight hours aging, and continuously reheating the expanded beads to a uniform softening temperature under essentially atmospheric pressure by the passage of a hot gas through the beads whereby the beads slightly agglomerate to form a plate compressing the plate to form a sheet while the plate is still hot, and cooling the compressed plate while under compression to form a foamed sheet having a density of about 15 to 40 kg/m$^3$.

3. A method according to claim 2 in which the expansions are accomplished by a hot gaseous agent comprising steam.

4. A method according to claim 2 in which the blowing agent is mixed pentane and isopentane.

5. A method according to claim 2 in which the two expansions are followed by a third in which the beads are first heated by hot air and then by steam.

6. A method according to claim 2 in which the density of the expanded beads after the second expansion is on the order of 10 to 12 kg/cm$^2$.

7. In a method according to claim 2, in which the expandable polystyrene beads are expanded to an apparent density of from about 10 to about 25 kg./m$^3$ and the plate is compressed to about one-half the original volume, and cooled under continued pressure.

8. In a method according to claim 7, wherein the plate is compressed under a pressure of about 0.5 to 4 metric tons/m$^2$.

* * * * *

UNITED STATES PATENT OFFICE
CERTIFICATE OF CORRECTION

Patent No. 3,800,018      Dated March 26, 1974

Inventor(s) Maurice Charpentier

It is certified that error appears in the above-identified patent and that said Letters Patent are hereby corrected as shown below:

IN THE TITLE PAGE:

Assignee should read -- Certain-Teed Products Corporation, Valley Forge, Pa. --.

Under subtitle "Other Publications", line 1, "Rigid Plastid Foams" should read --Rigid Plastic Foams--.

In the Abstract, line 4, "relative" should read --relatively--.

Col. 1, line 37, "631,133" should read --3,631,133--.

Signed and sealed this 19th day of November 1974.

(SEAL)
Attest:

McCOY M. GIBSON JR.
Attesting Officer

C. MARSHALL DANN
Commissioner of Patents